W. C. STEPHENS.
VALVE GEAR FOR ROCK DRILLING.
APPLICATION FILED MAY 1, 1915.

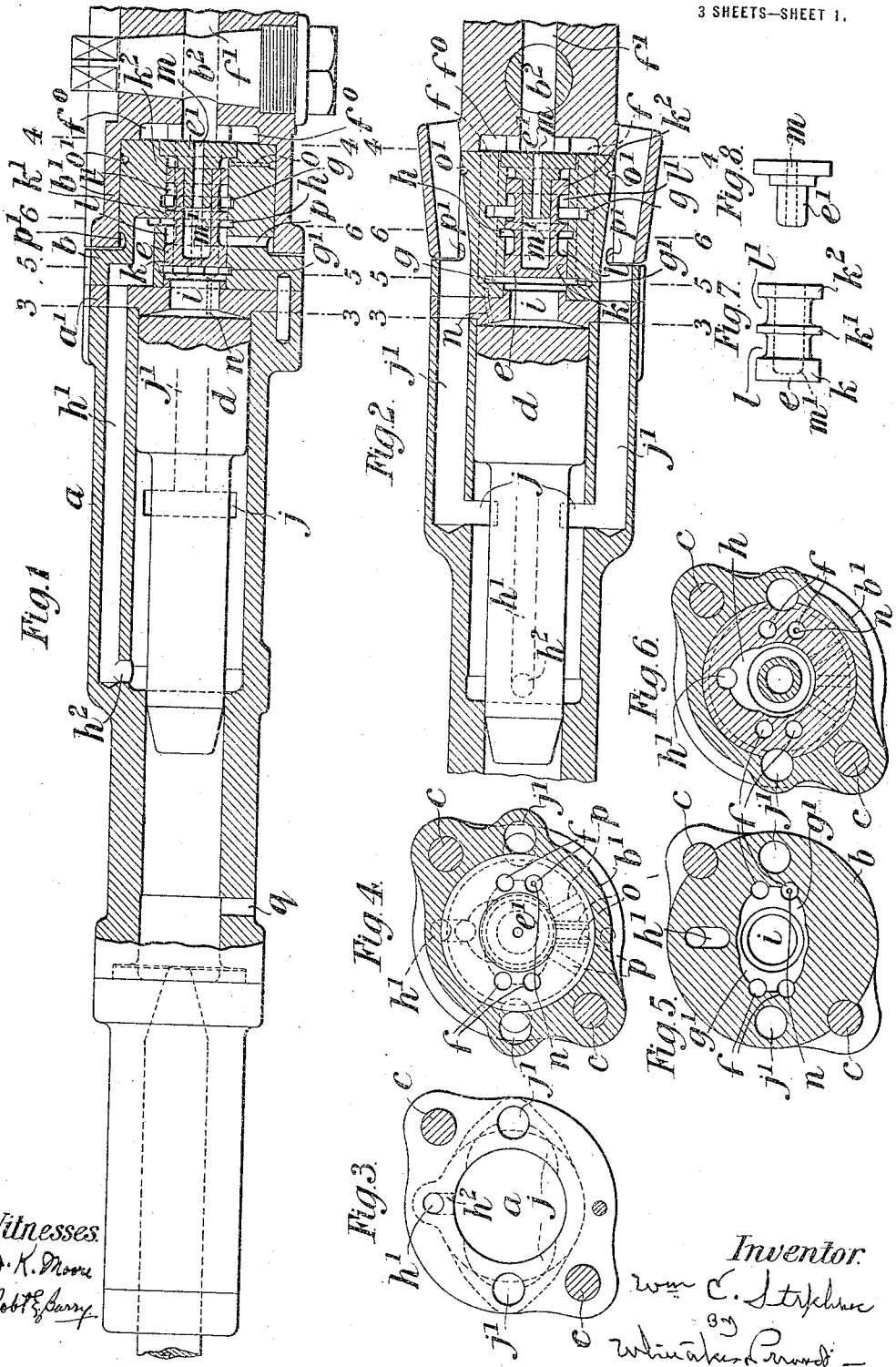

1,279,929.

Patented Sept. 24, 1918.
3 SHEETS—SHEET 2.

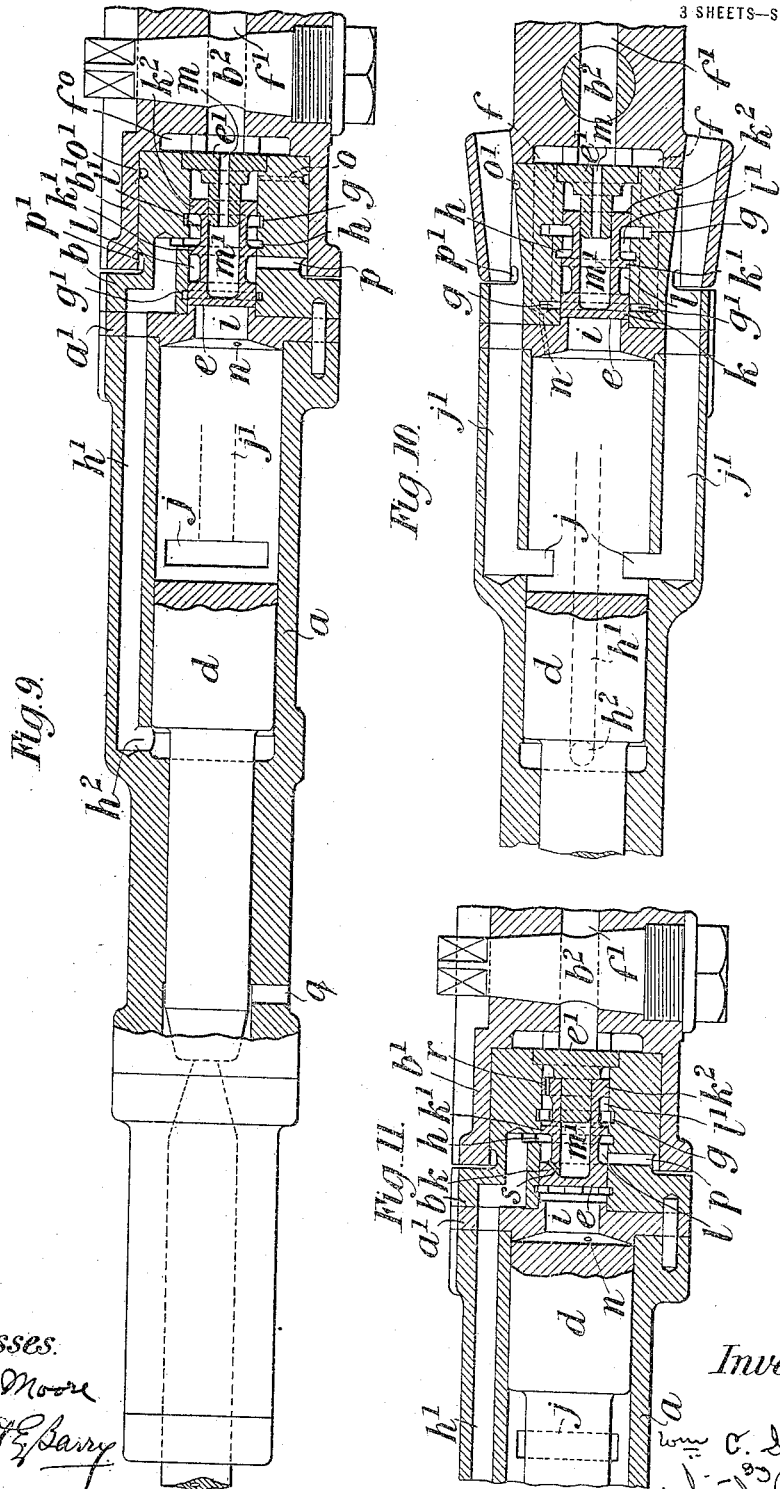

UNITED STATES PATENT OFFICE.

WILLIAM CHARLES STEPHENS, OF CARN BREA, ENGLAND.

VALVE-GEAR FOR ROCK-DRILLING.

1,279,929.  Specification of Letters Patent.  Patented Sept. 24, 1918.

Application filed May 1, 1915. Serial No. 25,249.

*To all whom it may concern:*

Be it known that I, WILLIAM CHARLES STEPHENS, a subject of the King of Great Britain, residing at The Climax Rock Drill & Engineering Works, Limited, Carn Brea, Cornwall, England, have invented new and useful Improvements in Valve-Gear for Rock-Drilling and like Machines, of which the following is a specification.

My invention relates to valve gear especially applicable for use in connection with rock drilling machines of the hammer type (but also applicable to similar engines or machines for other purposes), the object of my invention being to simplify the construction of the valve and the ports for the admission and escape of the driving fluid, whereby the efficiency of the machine is improved.

In the machine constructed according to my invention the distributing valve is preferably arranged so that it moves in axial alinement with the hammer, the chest in which the valve works being placed at the rear end of the cylinder and being advantageously covered and held in position by a casing provided with a cock for controlling the air supply; if desired, however, the valve chest may be arranged without the casing and the air tap connected direct to the valve chest or fixed in any other suitable position on the cylinder.

The valve is provided with collars and grooves which coöperate with ports in the valve chest, and the said valve is made hollow and adapted at its rear end to slide upon a spill or stud fixed in the valve chest, and which spill serves for differentiating the area of the surfaces against which the air pressure operates at the front and rear of the valve, to an extent determined by the cross sectional area of the said spill or stud.

My invention will be readily understood by reference to the accompanying drawings, in which:—

Figure 1 is a sectional side view of a rock drilling machine provided with a valve arranged in accordance with my invention, the valve being shown in position for admitting air to drive the piston forward.

Fig. 2 is a sectional view of the rear portion of the drill but in a plane at right angles to the section in Fig. 1.

Figs. 3, 4, 5 and 6 are sections on the lines 3—3, 4—4, 5—5, and 6—6, respectively, of Figs. 1 and 2.

Figs. 7 and 8 are elevations respectively, of the valve shown in Figs. 1 and 2 and of the spill upon which it slides.

Fig. 9 is a view similar to Fig. 1, but showing the valve and piston in the forward position.

Fig. 10 is a sectional view of the rear end of the drill shown in Fig. 9, the plane of the section being at right angles to the plane of the section in the said latter figure.

Fig. 11 is a view similar to the rear end of Fig. 1 but illustrating a different arrangement for operating the valve by the air pressure.

Figure 12:
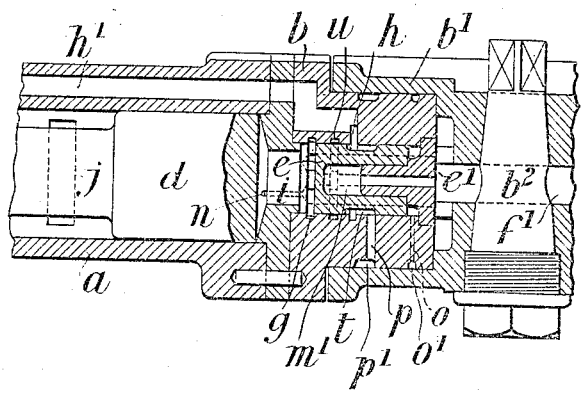
Figure 13:
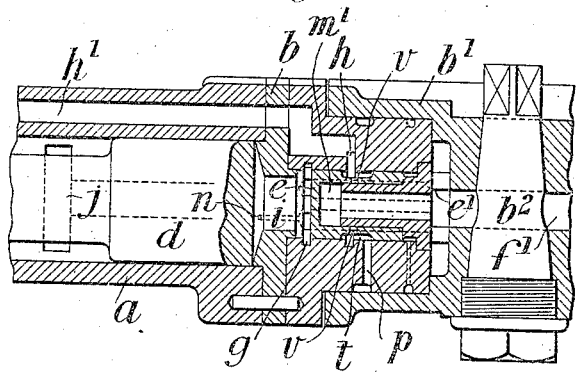

Figs. 12 and 13 are views similar to Fig. 11 illustrating further modifications.

Referring to the arrangement shown in Figs. 1 to 10, $a$ indicates the working cylinder of the drill, $a^1$ the rear cover thereof, $b$ the valve-chest and $b^1$ a casing which covers part of the said chest and which is provided with a cock $b^2$ for regulating the air supply, the said cylinder, cover, valve-chest and casing being held in position by longitudinal bolts $c$, $c$ which also extend through the front cover of the cylinder in a manner which is well known and will be readily understood.

$d$ is the hammer piston which reciprocates in the cylinder $a$, and $e$ is the valve for distributing the air and which valve coöperates with ports formed in the valve-chest $b$. $e^1$ is the spill or stud upon which the valve $e$ slides, and which, as shown, is provided with a rear flange seated in a recess in the end of the valve-chest $b$.

$f$, $f$ are passages formed in the valve-chest $b$, which passages open into a space $f^0$ in communication with the air supply passage $f^1$ through the cock $b^2$, and which passages open into the interior of the said valve-chest through ports $g$, $g^1$. $h$ is another port formed in the valve-chest and which is in communication, through the passage $h^1$ (Figs. 1, 5 and 6) in the valve-chest $b$, the cover $a^1$ and the cylinder $a$, with the port $h^2$ at the front end of the cylinder.

$i$ is a port or opening which establishes communication between the interior of the valve-chest $b$ and the interior of the cylinder $a$ behind the piston $d$, and $j$, $j$ are exhaust ports formed in the cylinder $a$ and through which and the passages $j^1$, $j^1$ the two ends of the cylinder are alternately placed in communication with the atmosphere.

In practice the passages $h^1$ and $j^1$ are advantageously formed by drilling holes in the cylinder $a$ cover $a^1$ and valve-chest $b$ and the ports by cutting slots with circular cutters moved laterally from the center of the valve-chest and of the cylinder, respectively, until they intersect the respective passages.

The valve $e$ is formed with three ribs or collars $k$, $k^1$, $k^2$ and with intermediate grooves $l$, $l^1$, which collars and grooves serve to separate or place the several ports and passages in communication in a manner hereinafter described.

$m$ is a passage formed through the spill or stud $e^1$ and which serves to place the recess $m^1$ in the valve in constant communication with the air supply passage $f^1$. $n$ is a small passage which establishes permanent communication between one of the air supply passages $f$ (Fig. 5) and the rear end of the cylinder $a$. $o$, $o$ are ports which place the space behind the valve $e$ between the latter and the flange of the spill $e^1$ in permanent communication with the exhaust passages $j^1$ through the groove $o^1$ and $p$, $p$ are ports which place the interior of the valve-chest in permanent communication with the said exhaust passages $j^1$ through the groove $p^1$.

$q$ is a port which serves to place the space, through which the front or hammer portion of the piston $d$ slides, in constant communication with the atmosphere to prevent compression and suction as the said piston reciprocates.

The operation of the apparatus hereinbefore described is as follows:—When the valve $e$ is in its rearward position, as shown in Figs. 1 and 2, the port $g^1$ is uncovered to admit compressed air to drive the piston $d$ forward, while the port $h$ is also uncovered and placed in communication with the port $p$ so that when the piston $d$ has moved forward sufficiently far to cover the main exhaust port $j$, the air in front of the piston will be driven out through the port $h^2$, the passage $h^1$, the port $h$ and the supplementary exhaust passages $p$. When during the forward movement of the piston $d$ the latter has uncovered the exhaust ports $j$, as shown in Figs. 9 and 10, so that the rear end of the cylinder $a$ is in communication with the atmosphere the lowering of pressure behind the piston will allow the live air, which acts on the rear face of the valve, by entering the recess $m^1$ in the latter through the passage $m$ in the spill $e^1$, to reverse the valve whereby the port $g^1$ will be closed by the collar $k$ of the said valve and the port $h$ cut off from communication with the ports $p$ by the collar $k^1$ and placed in communication with the live air port $g$ through the groove $l^1$ with the result, that the live air will pass through the ports $g$ and $h$, passage $h^1$ and port $h^2$ to drive the piston backward. As the piston moves rearwardly and after it has covered the exhaust port $j$ the air behind the said piston is compressed, the pressure of the air being at the same time increased owing to the leak of air through the passage $n$, with the result, that the air pressure acting upon the front of the valve $e$ which front is of larger area than the portion exposed to the air pressure at the rear of the valve, will again move the valve rearwardly to the position shown in Figs. 1 and 2 to shut off the air supply to the front of the cylinder and to again admit air through the port $i$, when the series of operations hereinbefore described will be repeated.

It will be understood that during the backward movement of the piston $d$ the air at the rear end of the cylinder $a$ is not exhausted, but compressed, whereby not only is the valve operated but a cushion is formed at the rear of the hammer.

Owing to the connection of the space between the back of the valve $e$ and the spill $e^1$ with the exhaust through the passages $o$ the compression of air in the said space or a leakage of live air cannot take place to check the rearward movement against the pressure acting on the valve in the recess $m^1$.

The arrangement of my invention illustrated in Fig. 11 differs only from that hereinbefore described in that, instead of admitting air into the valve $e$ for moving it in one direction, the air acts upon the rim of the said valve around the spill $e^1$. To allow of this taking place a passage $r$ is formed in the rear collar $k^2$ of the valve so as to allow the live air which enters the groove $l^1$ from the port $g$ to pass behind the valve. Another passage $s$ is also formed to place the recess $m^1$ within the valve $e$ in communication with the exhaust ports $p$ through the groove $l$.

In the arrangements of my invention hereinbefore described the groove $l^1$ of the valve $e$ is permanently in communication with the live air supply, while the groove $l$ is permanently in communication with the exhaust.

In the modification of my invention illustrated in Fig. 12, the valve $e$ is constructed with a single groove $t$ only, which alternately serves for the supply and for the exhaust. When the valve is in the position shown in the said figure, the said groove $t$ is in a position in which the port $h$ is in communication with the exhaust. When, however, the valve moves forward to close the port $g$, the exhaust passage $p$ is also closed and a port $u$ in the valve-chest $b$ in communication with the passages $f$ of the live air supply is placed in communication with the port $h$ to admit live air to the front of the piston.

I sometimes modify the means for admitting air as follows, and as illustrated in Fig. 13, that is to say, instead of employing a port $u$ in the valve-chest as described in the last modification, to allow the air to enter the groove $t$, I dispense with this port and I form a series of holes or passages $v, v$ through the valve itself in the bottom of the said groove $t$, so that when the valve is in its forward position the said holes will be uncovered by the spill $e^1$ the air then entering the groove $t$ and passing thence through the port $h$ to the front end of the cylinder $a$, while when the valve is forced backward by the compression as before described, to the position shown in Fig. 13, the holes $v$ will be covered up and the port $h$ will be in communication with the exhaust through the ports $p$.

Although I have described my invention as applied to a rock drill, it will be understood, that it can equally well be applied to riveting and other similarly operating percussion tools.

Having now particularly described and ascertained the nature of my said invention and in what manner the same is to be performed, I declare that what I claim is:—

1. In a rock drilling machine, the combination with a working cylinder provided intermediate its length with exhaust apertures, of a piston arranged in said cylinder, said cylinder being provided in its rear with an aperture for admitting air to drive the piston forward, a valve chest connected to the rear end of the cylinder and provided with a valve passage, and air ports for conducting air from the air supply to the air inlet aperture, a conduit connecting the valve passage with the front end of the cylinder, a hollow stud mounted in the valve passage and extending forward beyond the point where the conduit communicates with the passage, and a cup valve mounted in said passage and sliding on the stud provided in its periphery with an annular groove which communicates with the interior of the valve through small holes in the valve, whereby when the valve is in its forward position live air will pass through the stud, valve holes, annular groove and conduit to the forward end of the cylinder.

2. In a rock drilling or like machine, the combination with a working cylinder, a piston reciprocating therein, an exhaust port formed in the said cylinder in such a position as to be closed by the piston when the latter in its rearward position covers the said port, a valve chest attached to the working cylinder, a port establishing direct communication between the interior of the cylinder and the interior of the valve chest, a stud at the rear end of the valve chest, a passage through the said stud and a hollow valve sliding upon the said stud, of a single groove or channel in the periphery of the said valve, a port communication with the front of the cylinder and an exhaust port both controlled by the valve, an opening establishing communication between the interior of the valve and the groove or channel therein, the said opening being in such a position that when the valve is in its forward position live air can pass from the interior of the valve to the front end of the cylinder, while when the valve is in its rearward position the said opening in the valve will be closed by the stud while the front end of the cylinder will be open to the exhaust, and a leak passage between the air supply and the rear end of the cylinder for admitting sufficient air behind the working piston, when the latter is moving rearwardly, to produce a greater pressure upon the front of the valve than that acting against the interior of the said valve.

WILLIAM CHARLES STEPHENS.

Witnesses:
 JOHN E. BOUSFIELD,
 C. G. REDFERN.

Copies of this patent may be obtained for five cents each, by addressing the "Commissioner of Patents, Washington, D. C."